(12) United States Patent
Oelke et al.

(10) Patent No.: US 10,712,239 B2
(45) Date of Patent: Jul. 14, 2020

(54) TECHNIQUE FOR MONITORING TECHNICAL EQUIPMENT

(71) Applicants: Daniela Oelke, Riemerling (DE); Jakob Wimmer, München (DE)

(72) Inventors: Daniela Oelke, Riemerling (DE); Jakob Wimmer, München (DE)

(73) Assignee: Siemens Aktiengesellschaft, München (DE)

( * ) Notice: Subject to any disclaimer, the term of this patent is extended or adjusted under 35 U.S.C. 154(b) by 294 days.

(21) Appl. No.: 15/675,727

(22) Filed: Aug. 12, 2017

(65) Prior Publication Data

US 2018/0045614 A1    Feb. 15, 2018

(30) Foreign Application Priority Data

Aug. 12, 2016  (EP) ..................................... 16184054
Aug. 31, 2016  (EP) ..................................... 16186665

(51) Int. Cl.
*G01M 99/00*   (2011.01)
*G05B 23/02*   (2006.01)

(52) U.S. Cl.
CPC ....... *G01M 99/008* (2013.01); *G05B 23/0272* (2013.01)

(58) Field of Classification Search
CPC . G01M 99/008; G05B 23/0272; G05B 19/04; G06K 9/621
See application file for complete search history.

(56) References Cited

U.S. PATENT DOCUMENTS 4,816,208 A      3/1989   Woods et al.
6,507,829 B1 *   1/2003   Richards ............... G06F 16/353
                                                 706/45
7,437,338 B1 *   10/2008  Forman .................. G06N 20/00
                                                 706/20

(Continued)

FOREIGN PATENT DOCUMENTS

EP           2595065 A1      5/2013

OTHER PUBLICATIONS

European Search Report for related European Application No. 16186665.2 dated May 11, 2017.

*Primary Examiner* — Mohammad K Islam
(74) *Attorney, Agent, or Firm* — Lempia Summerfield Katz LLC (57) ABSTRACT

Event inputs, each belonging to one of predefined event categories, are received from event status reporting units. A time period, a time duration within which the event inputs were received, is segregated into an ordered sequence of time slots. Inputs are categorized according to the time slots and the event categories. Ranks, based on weights of unique event inputs, are assigned to each of the predefined event categories within each of the time slots. A count of symbols for each time slot is defined. Each symbol represents a unique predefined event category. The time slots and the defined count of symbols ordered according to the ranks of the respective predefined event categories represented by the symbols for each of the time slots are displayed. Each symbol includes an indication of the weight of unique event inputs categorized for the selected predefined event category and for the selected time slot.

18 Claims, 7 Drawing Sheets

(56) References Cited

U.S. PATENT DOCUMENTS

| | | | | |
|---|---|---|---|---|
| 7,958,457 | B1* | 6/2011 | Brandenberg | G06F 16/9535 715/789 |
| 8,620,720 | B2* | 12/2013 | Salomatin | G06Q 10/06 705/7.12 |
| 8,719,073 | B1* | 5/2014 | Kirshenbaum | G06Q 30/0201 705/7.32 |
| 8,943,083 | B2* | 1/2015 | Aravamudan | G06F 16/284 707/758 |
| 9,563,666 | B2* | 2/2017 | Larsson | G06F 16/24578 |
| 10,387,475 | B2* | 8/2019 | Bhave | G06F 16/338 |
| 2002/0163427 | A1* | 11/2002 | Eryurek | G05B 23/027 340/500 |
| 2003/0014699 | A1* | 1/2003 | Kallela | G05B 19/41875 714/47.3 |
| 2004/0186927 | A1* | 9/2004 | Eryurek | G05B 15/02 710/12 |
| 2007/0219985 | A1* | 9/2007 | Aravamudan | G06F 16/24578 |
| 2009/0100293 | A1* | 4/2009 | LaComb | G05B 23/0229 714/26 |
| 2009/0320047 | A1* | 12/2009 | Khan | G06F 9/542 719/318 |
| 2010/0211192 | A1* | 8/2010 | Stluka | G06F 16/2477 700/12 |
| 2012/0283988 | A1* | 11/2012 | Pandey | G06Q 30/06 702/179 |
| 2013/0063264 | A1* | 3/2013 | Oktem | G05B 23/024 340/540 |
| 2013/0173181 | A1 | 7/2013 | Shaikh et al. | |
| 2014/0006871 | A1* | 1/2014 | Lakshmanan | H04L 41/065 714/37 |
| 2015/0077276 | A1* | 3/2015 | Mitchell | H04W 4/021 340/995.1 |
| 2015/0161529 | A1* | 6/2015 | Kondaji | G06Q 10/063 705/7.11 |
| 2015/0199775 | A1* | 7/2015 | Pfeiffer | G06Q 10/06398 705/7.42 |
| 2015/0294048 | A1* | 10/2015 | Jones | G06Q 10/0635 703/2 |
| 2016/0062820 | A1* | 3/2016 | Jones | G06F 11/0721 714/37 |
| 2016/0259842 | A1* | 9/2016 | Knight | G06F 16/00 |
| 2017/0277727 | A1* | 9/2017 | Chen | G06F 21/56 |
| 2018/0082207 | A1* | 3/2018 | Cormier | G06F 16/2365 |

* cited by examiner

72 = x-axis representing time slots
74 = y-axis representing ranks
83 = first cluster
84 = third cluster
85 = second cluster
86 = fourth cluster
90 = time period
99 = time slot

TECHNIQUE FOR MONITORING TECHNICAL EQUIPMENT

BACKGROUND

This application claims the benefit of EP 16184054.1, filed on Aug. 12, 2016, and EP 16186665.2, filed on Aug. 31, 2016, which are hereby incorporated by reference in their entirety.

The present embodiments relate to techniques for monitoring technical equipment.

Process plants have a variety of technical equipment for example, but not limited to, equipment used in Chemical plants, Petrochemical and refineries, Pulp and Paper Mills, Boiler controls and power plant systems, Power generation plants, Nuclear power plants, Water management systems, Water treatment plants, Sewage treatment plants, Food/Beverage plants, Agro chemical and fertilizer plants, Metal/Metal alloys manufacturing or extraction plants and mines, Metallurgical process plants, Automobile manufacturing plants, Pharmaceutical manufacturing plants, Refining plants such as Sugar refineries, product manufacturing and processing plants such as cement manufacturing plants and so on and so forth. The technical equipment is required to be constantly or periodically monitored for desired function and states for example in a power generation plant using a gas turbine as equipment a state of the gas turbine—operational or idle or start-up phase etc needs to be monitored constantly or periodically for optimum production of power from the gas turbine. The equipment is monitored by collecting inputs, or event inputs, such as sensor readings associated with the equipment, inputs provided by local process controllers or controllers at different levels as in distributed control systems to the central control system, and so on and so forth. An example of an event is vibrations reaching a predefined frequency in a gas turbine and an example of corresponding event input may be a frequency of vibrations detected by a suitable sensor associated with the gas turbine. Other examples of event inputs may be, but not limited to, a temperature of a boiler as detected by a temperature sensor, or alarms generated from alarm systems when certain equipment is detected to be in a particular state.

The event inputs, for example the alarms, are presented to an operator and the event inputs informs the operator about the events, some of which may be critical events, occurring during the run of a machine as an example of equipment. Each event input may belong to an event type or an event category, for example temperature readings may belong to event category named thermal state of the boiler. Different event categories and associated event inputs in the event categories may have different meanings for example warnings for information on changes of the system state such as change of equipment state, alarms if critical system states are reached, messages regarding operator/controller actions to the equipment, system responses as in equipment responses, messages from operator station/automation station, predictive maintenance request, etc.

At least some of the events may require an operator or controller reaction/response corresponding to the event input. A timely reaction to the event may prevent or reverse a loss of production quality or damage to a machine. However, typically lots of events are simultaneously and/or successively occurring in a given time period in the process plant and thus lots of event inputs may be presented to the operator/controller. A problem thereby is the often overwhelming amount of the event inputs, for example alarms, that the operator/controller has to deal with on a daily basis and within a short period of time within the day. This relates to events such as alarms, warnings and predictive maintenance requests.

One of the approaches to address the above mentioned problem may be to address or respond to those event inputs that have a high priority or frequency or ranking. This necessitates need for a technique to effectively monitor technical equipment such that event inputs that have a high priority or frequency or ranking are addressed first.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a technique for monitoring technical equipment that addresses the abovementioned problem is provided.

Features of independent claims may be combined with features of claims dependent on the respective independent claim, and features of dependent claims may be combined together, unless otherwise indicated.

According to a first aspect of the present technique, a method for monitoring technical equipment is presented. The method includes receiving, by a processor, a plurality of event inputs from one or more event status reporting units, where each event input belongs to one of a plurality of predefined event categories. The processor segregates a time period into an ordered sequence of time slots, where the time period represents a time duration within which the event inputs were received. The processor categorizes each event input according to the time slot within which the event input was received and according to the predefined event category to which the event input belongs. The processor assigns a rank to each of the predefined event categories within each of the ordered sequence of time slots. The rank of a selected predefined event category within a selected time slot is based on a weight of unique event inputs categorized for the selected predefined event category and for the selected time slots. The processor defines a count of symbols to be displayed for each of the time slots. Each symbol represents a unique predefined event category. The count of the symbols is same for all the time slots. A display unit displays the ordered sequence of time slots. The display unit displays, for each of the ordered sequence of time slots, the defined count of symbols ordered according to the ranks of the respective predefined event categories represented by the symbols. Each symbol includes an indication of the weight of unique event inputs categorized for the selected predefined event category and for the selected time slot.

As a result of the present monitoring technique, the event categories displayed (e.g., the symbols representing different event categories) per time slot are limited, the event categories are ranked, and the indication of the weight of unique event inputs within a given event category symbol gives a quantitative measure of how much two ranks differ (e.g., if there are two event categories—an event category A and an event category B, and both the event categories appear in a first case and a second case, and in both cases the event category A is ranked to an immediate higher rank of event category B, the operator/controller may still differentiate between the cases by the indication of the weight of unique event inputs within their respective given event category symbols; in first case, the event category A may have ten event inputs and the event category B may have two; in the second case, the event category A may have three event inputs and event category B may have two; then, although the ranking of the event categories A and B remain same in both cases, in first case the indication of the weight signifies additional information that may be useful in operator action or urgency of operator action).

In an embodiment of the method, for at least one of the selected predefined event categories, the weight of the unique event inputs categorized for the selected predefined event category and for the selected time slots is a number of the unique event inputs categorized for the selected predefined event category and for the selected time slots.

In another embodiment of the method, for at least one of the selected predefined event categories, the weight of the unique event inputs categorized for the selected predefined event category and for the selected time slots is a percentage calculated depending on an application and the event category for the unique event inputs categorized for the selected predefined event category and for the selected time slots.

In another embodiment of the method, the indication of the weight of unique event inputs categorized for the selected predefined event category and for the selected time slot displayed on the display unit is interactive and is configured to show a numerical representation of the weight of unique events categorized for the selected predefined event category and for the selected time slot when interacted with by an operator.

In another embodiment of the method, at least one of the event status reporting unit is a sensor and at least one of the predefined event categories is readings of the sensor and wherein the event inputs belonging to said predefined event category are the readings having predetermined characteristics.

In another embodiment of the method, at least one of the event status reporting unit is an input device adapted to receive inputs manually and at least one of the predefined event categories is inputs received by the input device and wherein the event inputs belonging to said predefined event category are the inputs having predetermined characteristics.

In another embodiment of the method, the processor is a programmable logic controller.

In another embodiment of the method, the displays are represented graphically having an x-axis representing the time slots and a y-axis representing the ranks, and wherein the symbols are 2-dimensional shapes having an enclosed area and the indication of the weight of unique event inputs within the symbols is provided by demarcating a section of the enclosed area corresponding to the weight of unique event inputs.

In another embodiment of the method, the symbol representing a given unique predefined event category within a given time slot displayed on the display unit has connecting bands associated with the symbol if the symbol representing the given unique predefined event category appears within at least two of the given time slots displayed on the display unit, and wherein the symbol representing the given unique predefined event category within the given time slot displayed on the display unit is connected by the connecting bands to the symbols representing the given unique predefined event category within time slots adjacent to the given time slot.

In another embodiment of the method, the connecting band associated with the symbol representing the given unique predefined event category within the given time slot starts from the symbol and ends at a pre-designated area, for example below the x-axis, if the symbol representing the given unique predefined event category is absent from within the adjacent subsequent time slot, and wherein the connecting band associated with the symbol representing the given unique predefined event category within the given time slot starts from the pre-designated area, for example from below the x-axis, and ends at the symbol if the symbol representing the given unique predefined event category is absent from within the adjacent previous time slot.

According to a second aspect of the present technique, a user interface for monitoring technical equipment is presented. The user interface includes: a data interface configured to receive a plurality of event inputs from one or more event status reporting units, wherein each event input belongs to one of the predefined event categories; a processor programmed to perform: segregation of a time period into an ordered sequence of time slots, wherein the time period represents a time duration within which the event inputs were received; categorize each event input according to the time slot within which said event input was received and according to the predefined event category to which said event input belongs; assign a rank to each of the predefined event categories within each of the ordered sequence of time slots, wherein the rank of a selected predefined event category within a selected time slot is based on a weight of unique event inputs categorized for the selected predefined event category and for the selected time slots; and define a count of symbols to be displayed for each of the time slots, wherein each symbol represents a unique predefined event category and wherein the count of the symbols is same for all the time slots; and a display unit configured to display the ordered sequence of time slots and to display for each of the ordered sequence of time slots, the defined count of symbols ordered according to the ranks of the respective predefined event categories represented by the symbols, wherein each symbol includes an indication of the weight of unique event inputs categorized for the selected predefined event category and for the selected time slot.

In an embodiment of the user interface, for at least one of the selected predefined event categories, the weight of the unique event inputs categorized for the selected predefined event category and for the selected time slots is one of a number of the unique event inputs categorized for the selected predefined event category and for the selected time slots, a percentage calculated depending on an application and the event category for the unique event inputs categorized for the selected predefined event category and for the selected time slots, and a combination thereof.

In another embodiment of the user interface, the processor is a programmable logic controller.

According to a third aspect of the present technique, a computer-readable storage media is presented. The computer-readable storage media has stored thereon: instructions executable by one or more processors of a computer system, wherein execution of the instructions causes the computer system to perform the method according to the first aspect of the present technique.

According to a fourth aspect of the present technique, a computer program is presented which is being executed by one or more processors of a computer system and performs the method according to the first aspect of the present technique.

DETAILED DESCRIPTION

Hereinafter, above-mentioned and other features of the present technique are described in details. Various embodiments are described with reference to the drawing, where like reference numerals are used to refer to like elements throughout. In the following description, for purpose of explanation, numerous specific details are set forth in order to provide a thorough understanding of one or more embodiments. The illustrated embodiments are intended to explain and not to limit the invention. Such embodiments may be practiced without these specific details.

The present technique has been described hereinafter in details by referring to FIG. 7 in combination with FIGS. 6 and 8. FIG. 7 schematically represents an exemplary embodiment of a user interface 1 of the present technique that is used for monitoring technical equipment 155, for example, but not limited to, a turbine 155 or a boiler 155. The present technique is applicable to any technical equipment that is to be monitored, for example, but not limited to equipment used in chemical plants such as boilers, mixing tanks, sedimentation tank, etc, similarly equipment used in petrochemical and refineries, pulp and paper mills, boiler controls and power plant systems, power generation plants, nuclear power plants, water management systems, water treatment plants, sewage treatment plants, food/beverage plants, agro chemical and fertilizer plants, metal/metal alloys manufacturing or extraction plants and mines, metallurgical process plants, automobile manufacturing plants, pharmaceutical manufacturing plants, refining plants such as sugar refineries, and product manufacturing and processing plants such as cement manufacturing plants. The technical equipment 155 has been hereinafter also referred to as the turbine 155 or the equipment 155 for purpose of explanation.

The technical equipment 155 is monitored by different devices such as sensors 150 that have been generally referred to as the event status reporting units 150. The sensors 150 read different aspects of the equipment 155, for example, a thermometer 155 reads a temperature of a particular segment of the turbine 150. The sensing of different aspects of the equipment 155 may be continuous (e.g., sensing temperature continuously from 8 AM in the morning to 8 PM in the evening on a given day), or may be intermittent (e.g., sensing temperature at one hour intervals starting at 8 AM in the morning up to 8 PM in the evening on a given day). Different sensors 150 or event status reporting units 150 sense or monitor or read different types of states or events or parameters of the event equipment 150 (e.g., one event status reporting unit 150 reads the temperature while another event status reporting unit 150 senses the vibrations in the turbine 155). Some readings may be more critical or important from perspective of monitoring the equipment 155 than other readings (e.g., vibrations with frequency higher than a defined cut-off frequency may be more critical than vibrations with frequency lower than the defined cut-off frequency), or, for example, temperature readings higher than a critical temperature may be more important than temperature readings lower than the critical temperature. The more important readings are indicative of certain events, and the sensor data or reading generated by the sensor 150 in response to these events is referred to as the event input 5. Depending on the application (e.g., power generation or chemical conversion) and/or need of the operator, parameters that make a reading an event input are fixed (e.g., may be predetermined or programmed that temperature readings above 800 degree centigrade for a section of the turbine 155 is an event input 5, whereas the temperature readings below 800 degree centigrade for the section of the turbine 155 is not an event input 5).

An example of an event may be vibrations reaching a predefined frequency in the gas turbine 155, and an example of corresponding event input 5 may be a frequency measure or alarm generated by a suitable sensor 150 associated with the gas turbine 150. Other examples of event inputs 5 may be, but not limited to, a temperature of a boiler 155 reaching a critical temperature, as detected by a temperature sensor 150, or alarms 5 generated from alarm systems 150 when certain equipment 155 is detected to be in a particular state. Hereinafter, the event input 5 has also been referred to as the alarm 5. Different types of event inputs 5, or event inputs 5 belonging to different categories, are hereinafter also referred to a first type and a second type of the alarm 5 (e.g., vibrations with frequency higher than a defined cut-off frequency may be referred to as the first type of the alarm 5, and temperature higher than cut-off temperature may be referred to as the second type of the alarm 5). In this example, 'vibrations' is a type of event category and 'temperature' is another type of event category. Also, 'temperature of one section' of the equipment 150 may be a type of event category and 'temperature of second section' of the equipment may be another type of event category.

Figure 6:
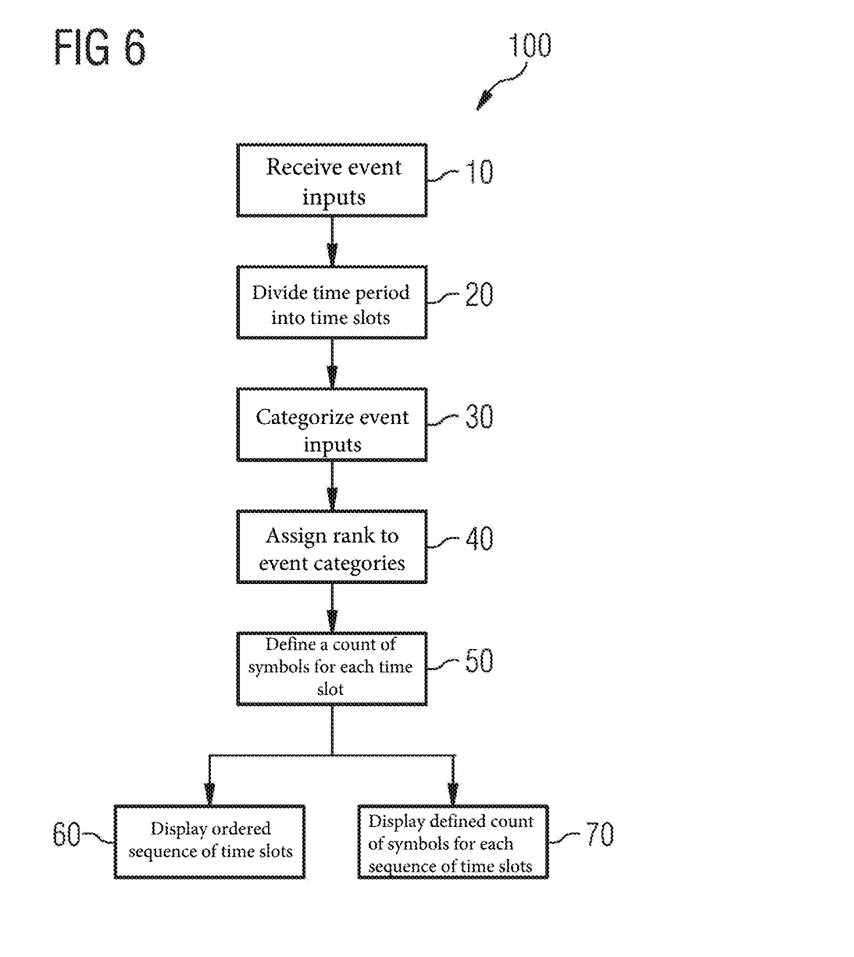
FIG. 6 depicts a flowchart showing an exemplary embodiment of a method.
Figure 7:
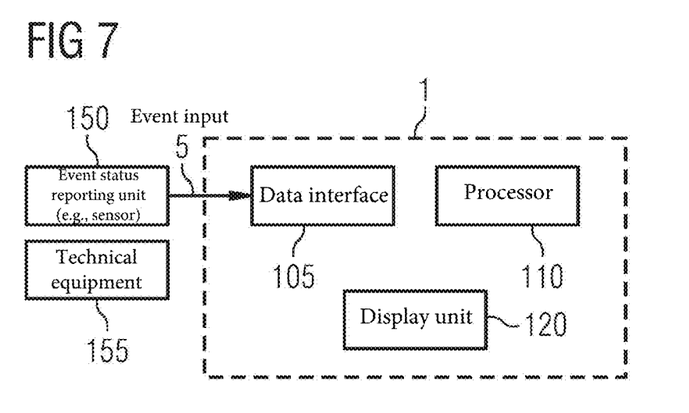
FIG. 7 schematically represents an exemplary embodiment of a user interface of the present technique.

The user interface 1 of FIG. 7 is used to implement an exemplary embodiment of a method 100, shown in FIG. 6, of the present technique.

The user interface 1, hereinafter also referred to as the UI 1, for monitoring technical equipment 155, includes a data interface 105, a processor 110, and a display unit 120. The data interface 105 receives different event inputs 5 (e.g., a plurality of event inputs 5; a number of first and second types of alarms 5 at different time instances). Each event input 5 or the alarm 5 is received from one or more event status reporting units 150 (e.g., sensors 150). As explained hereinabove, each event input 5 belongs to one of the predefined event categories. The data interface 105 may be part of the processor 110 or may be a data or signal receiver that is configured to communicate with the processor 110. The event inputs 5 are either generated automatically, for example by sensor reading, or may be an input device that receives inputs manually (e.g., an input fed into a computer or a receiver by a maintenance staff working in the power plant). The event inputs 5 may be communicated to the data interface 105 through a memory that has received and stored event inputs 5 over a given time period. In FIG. 6, act 10 is receiving a plurality of event inputs 5 from the one or more event status reporting units 150.

As has been explained hereinabove, each event input 5 belongs to one of a plurality of predefined event categories, and each event input 5 is received at a given time instance. All the event inputs 5 that are used in the present method 100 for monitoring the equipment 155 are received within a time period 90 (not shown in FIGS. 6 and 7, shown in FIG. 8) (e.g., 8 AM to 8 PM on a given day). Thus, each event input 5 has a corresponding event category to which the event input 5 belongs and has a time instance signifying time of occurrence of the event that resulted in generation of the event input 5, or to state simply a time when the event input 5 was received.

The processor 110 in the UI 1 is programmed to perform several acts of the method (e.g., act 20, act 30, act 40, and act 50 of the method 100). The processor 110 may be, but not limited to, a microprocessor, a programmable logic controller, etc. In act 20, the processor 110 segregates or divides the time period 90 into an ordered sequence of time slots 99 (not shown in FIGS. 6 and 7, shown in FIG. 8). As stated hereinabove, the time period 90 represents a time duration within which the event inputs 5 were received. The time slots 99 may be of equal duration (e.g., the time period 90 may be from 8 AM to 8 PM on a given day, and the time slots 99 may be of duration of one hour each; a first time slot 99 is from 8 AM to 9 AM, a second time slot 99 is from 9 AM to 10 AM, and a third time slot 99 is from 10 AM to 11 AM). The duration of time slots 99 may be preset for the method 100 or may be selected or decided by a user of the method 100 (e.g., the time period 90 from 8 AM to 8 PM on the given day may be divided into the time slots 99 having duration of two hours each; a first time slot 99 is from 8 AM to 10 AM, a second time slot 99 is from 10 AM to 12 noon, and a third time slot 99 is from 12 noon to 2 PM).

In act 30, each event input 5 or the different alarms 5 are categorized or clustered according to the time slot 99, within which the event input 5 was received (e.g., according to the time slot 99 in which the event that resulted into the respective event input 5 occurred) and according to the predefined event category to which the event input 5 belongs.

For example, if a total of twenty alarms 5 were generated by the sensors 150 or received by the data interface 105 or the processor 110, then each alarm 5 is categorized according to the predefined event category (e.g., fourteen out of the twenty alarms 5 are categorized as a first type of alarm 5 and remaining six are categorized as a second type of alarm 5). The time period 90 was from 8 AM to 10AM, and the time slots 99 are a first time slot 99 from 8 AM to 9 AM and a second time slot 99 from 9 AM to 10AM. Then, each alarm 5 of the first type and the second type is again categorized according to the time slot 99. Thus, in the present example, a total of four categories or clusters will be formed (e.g., a first cluster, all the first type of alarms 5 generated by events occurring in the first time slot 99 from 8 AM to 9 AM, having a total of eight individual alarms 5; a second cluster, all the first type of alarms 5 generated by events occurring in the second time slot 99 from 9 AM to 10 AM, has a total of six individual alarms 5, a third cluster, all the second type of alarms 5 generated by events occurring in the first time slot 99 from 8 AM to 9 AM, has a total of five individual alarms 5; and a fourth cluster, all the second type of alarms 5 generated by events occurring in the second time slot 99 from 9 AM to 10AM, and has a total of one individual alarm 5).

The first time slot 99 has two clusters within the first time slot 99 or corresponding to the first time slot 99 (e.g., first cluster and the third cluster), whereas the second time slot 99 also has two clusters within the second time slot 99 or corresponding to the second time slot 99 (e.g., second cluster and the fourth cluster).

In act 40, a rank is assigned to each of the predefined event categories within each of the ordered sequence of time slots 99, or to the different clusters created in the act 30. The rank of a selected predefined event category within a selected time slot 99 is based on a weight of unique event inputs 5 categorized for the selected predefined event category and for the selected time slot 99. Thus, continuing the above example, because the first cluster has eight individual alarms 5, or occurrences of the alarm 5, the first cluster is ranked first, whereas because the third cluster has five individual alarms 5, or occurrences of the alarm 5, the third cluster is ranked second, within the first time slot 99. Similarly, because the second cluster has six individual alarms 5 or occurrences of the alarm 5, the second cluster is ranked first, whereas because the fourth cluster has one individual alarms 5, or occurrence of the alarm 5, the fourth cluster is ranked second, within the second time slot 99.

The weight of a cluster may be simply based on a number of the unique event inputs 5 categorized in that cluster or may be a percentage calculated depending on an application and the event category for the unique event inputs 5 categorized in that cluster. The aforementioned ranking example is based on the number of the unique event inputs 5 categorized in each of the four clusters. An example of a percentage calculated depending on an application and the event category for the unique event inputs 5 categorized in that cluster may be when a vibration frequency in a turbine 155 reaches dangerously high value then even one occurrence of the alarm 5 pertaining to the dangerously high vibrational frequency may have more weight compared to, for example, five occurrences of vibration frequency in the turbine 155 reaching a non-optimal but non-threatening vibrational frequency.

In act 50, a count of symbols 8 (not shown in FIGS. 6 and 7, shown in FIG. 8) to be displayed is defined for each of the time slots 99. Each symbol 8 represents a unique predefined event category, or in other words, each symbol represents different types of clusters (e.g., the first and the second clusters in above example may be represented by a first symbol because both represent clusters having unique alarms 5 that belong to the same predefined event category, whereas the third and the fourth clusters in above example may be represented by a second symbol because both represent clusters having unique alarms 5 that belong to the same predefined event category, but different from the predefined event category corresponding to the first and the second clusters). The count of the symbols 8 is same for all the time slots 99.

In act 60 of the method 100 of FIG. 6, the processor 110 configures or controls or directs the display unit 120 to display or show or portray or present the ordered sequence of time slots 99. Additionally and simultaneously, the processor 110 configures or controls or directs the display unit 120 to display in act 70 of the method 100, for each of the ordered sequence of time slots 99, the defined count of symbols 8 ordered according to the ranks of the respective predefined event categories or the clusters represented by their respective symbols 8. In act 70, each symbol 8 includes an indication of the weight of unique event inputs 5 categorized for the selected predefined event category and for the selected time slot 99.

Figure 1:
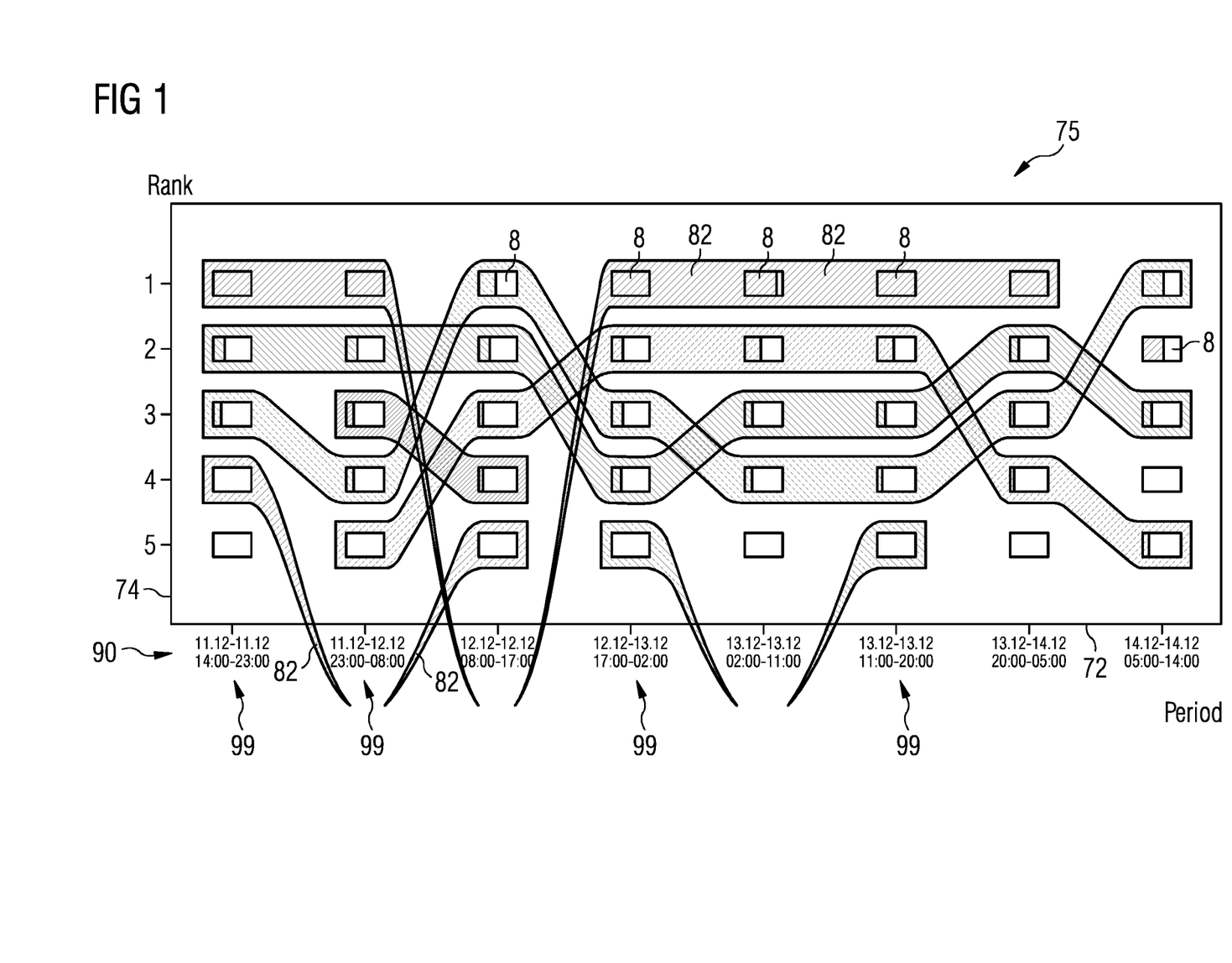
FIG. 1 schematically represents an exemplary embodiment of a scheme of display on a display unit.
Figure 8:
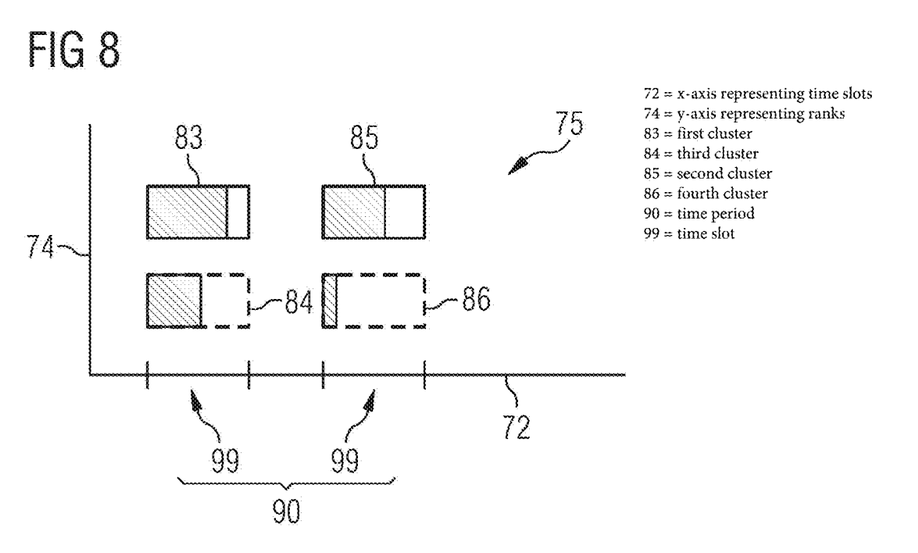
FIG. 8 schematically represents an exemplary embodiment of a simplified scheme of display.

An example of such a display or representation is shown in simplified form in FIG. 8 and more detailed form in FIG. 1, where displays in the acts 60 and 70 of the method 100 are represented graphically 75 having an x-axis 72 representing the time slots 99 and a y-axis 74 representing the ranks. As shown in FIGS. 8 and 1, in an exemplary embodiment, the symbols 8 are 2-dimensional shapes having an enclosed area (e.g., the rectangles or boxes of FIGS. 8 and 1). In the exemplary embodiment of FIGS. 8 and 1, the indication of the weight of unique event inputs 5 within the symbols 8 is provided by demarcating a section of the enclosed area corresponding to the weight of unique event inputs 5 for each cluster.

For example, continuing the aforementioned examples, FIG. 8 depicts a symbol 8 (e.g., a rectangle of solid line represented by reference numeral 83). FIG. 8 depicts the first cluster (e.g., all the first type of alarms 5 generated by events occurring in the first time slot 99), and the area shaded in the rectangle 83 represents or is proportional to the weight of the first cluster (e.g., represents or indicates that there are total eight individual alarms 5 in the first cluster). A similar symbol 8 (e.g., the rectangle of solid line represented by reference numeral 85) depicts the second cluster (e.g., all the first type of alarms 5 generated by events occurring in the second time slot 99), and the area shaded in the rectangle 85 represents or is proportional to the weight of the second cluster (e.g., represents or indicates that there are total six individual alarms 5 in the second cluster). Another symbol 8 (e.g., a rectangle of dashed line represented by reference numeral 84) depicts the third cluster (e.g., all the second type of alarms 5 generated by events occurring in the first time slot 99), and the area shaded in the rectangle 84 represents or is proportional to the weight of the third cluster (e.g., represents or indicates that there are total five individual alarms 5 in the third cluster). A similar symbol 8 (e.g., the rectangle of dashed line represented by reference numeral 86) depicts the fourth cluster (e.g., all the second type of alarms 5 generated by events occurring in the second time slot 99), and the area shaded in the rectangle 86 represents or is proportional to the weight of the fourth cluster (e.g., represents or indicates that there is total one individual alarm 5 in the fourth cluster).

Thus, the graphical representation 75 represents a limited number of clusters for each time slot 99, displays the rank of each cluster within each of the time slot 99, and also indicates the weight associated with the cluster (e.g., an absolute value of the individual occurrences for each of the clusters). It may be noted that box or rectangle shape is used in FIGS. 8 and 1 only for purpose of example, and it may be appreciated by one skilled in the art that use of different types of symbols (e.g., two dimensional geometrical shapes other than rectangles) is well within the scope of the present technique. The symbols 8 may also be chromatically differentiated.

FIG. 1 shows an exemplary embodiments of a scheme of display or the graphical representation 75, on the display unit 120, the graphical representation 75 is hereinafter also referred to as the rank chart 75, and presents a more realistic view of the graphical representation 75 as compared to the simple graphical representation 75 of FIG. 8. The rank chart 75 shows an ordered sequence of time slots 99 that are to be compared to each other with respect to frequency (e.g., the weight and rank changes of certain event categories hereinafter also referred to as event types). Each column in the chart represents one time period and shows top-ranked event types or clusters within each of the time slots 99. Each rectangle of the column represents one event type or cluster or event category in a corresponding time slot 99. Within a column, the event types or clusters are rank-ordered, so the most frequent event type is displayed in row 1 (e.g., have first rank in respective time slot 99, the second most frequent in row 2 have second rank in respective time slot 99, etc., as explained in reference to FIG. 8).

The length of the bar shown in the rectangles 8 or the shaded area in the rectangle 8 that is the symbol 8 for the event categories or event types depicts a corresponding absolute frequency within that time slot 99. This way a user (e.g., the operator/controller may get an impression if a lower ranked event type was only slightly less frequent than a higher ranked one or if the difference between the two was significant).

As depicted in FIG. 1, in the method 100, the symbol 8 representing a given unique predefined event category within a given time slot 99 displayed on the display unit 120 has connecting bands 82 associated with the symbol 8 if the symbol 8 representing the given unique predefined event category appears within at least two of the given time slots 99 displayed on the display unit 120. The symbols 8 of the same type if present in adjacent time slots 99 are connected together (e.g., the symbol 8 representing the given unique predefined event category within the given time slot 99 displayed on the display unit 120 is connected by the connecting bands 82 to the symbols 8 representing the given unique predefined event category within time slots 99 adjacent to the given time slot 99).

However, in the method 100, and as depicted in FIG. 1, the connecting band 82 associated with the symbol 8 representing the given unique predefined event category within the given time slot 99 starts from the symbol 8 and ends in a pre-designated area (e.g., below the x-axis 72) if the symbol 8 representing the given unique predefined event category, although appears at least twice in the rank chart 75, is absent from within the adjacent subsequent time slot 99. The connecting band 82 associated with the symbol 8 representing the given unique predefined event category within the given time slot 99 starts from the pre-designated area (e.g., below the x-axis 72) and ends at the symbol 8 if the symbol 8 representing the given unique predefined event category is absent from within the adjacent previous time slot 99. As shown with reference to the exemplary embodiment of FIG. 1, the connecting bands 82 are only shown if an event type occurs at least in two different slots 99 of the rank chart 75. If there are one or multiple time slots 99 in which the event type does not occur, the connecting band 82 plunges towards and beyond the x-axis 72 of the rank chart 75, the bottom, and reenters the rank chart 75 where the event type re-appears again in a subsequent time slot 99.

In another embodiment (not shown) of the present technique, instead of making the connecting bands 82 end below the x-axis 72, the connecting bands 82 end in the pre-designated area or region of the graphical representation 75 (e.g., in a region adjacent to and above the x-axis 72).

For symbol 8 representing a given unique predefined event category within a given time slot 99 displayed on the display unit 120, no connecting bands 82 are associated with the symbol 8 if the symbol 8 representing the given unique predefined event category does not appears within at least two of the given time slots 99 displayed on the display unit 120. Because a connecting band 82 is only added if an event type occurs in multiple time slots 99, the presence of the connecting bands 82 also distinguishes recurring event types from types that occur only once.

The connecting band 82 is a ribbon like or band like display represented on the display unit 120. Colored ribbons (e.g., the connecting bands 82) link the rectangles 8 that represent the same event type. This makes it easier to follow development over the different time slots 99.

The representation or indication of the weight in symbols 8 may be achieved by different ways of normalization. As mentioned above, the lengths of the bars (e.g., the demarcated area of the rectangles 8) are set proportional to the weight (e.g., absolute frequency) of a given event type in the specific time slot 99. Three exemplary ways of normalization are. With global normalization, the bar of the event type that is most frequent in one of the time slots 99 fills rectangle 8 completely (in the respective time slot 99). All other bars in similar rectangles 8 (e.g., representing same type of clusters within other time slot 99) are scaled relative to this value. The lengths of all bars in the rank chart 85 for same type of clusters are comparable to each other (e.g., a cluster in a time slot 99 may be compared to the cluster formed of same type of event inputs in another time slots 99).

With column-wise normalization, the bar of the top-ranked event type of each column fills its rectangle 8 completely; the lengths of the bars of the other event types in the column (e.g., within the same time slot 99) are set proportional to this value.

With row-wise normalization, in each row (e.g., for each rank-level), the most frequent or the one with maximum weight event-type is determined, and the lengths of the bars of each row are scaled relatively to this value.

Figure 2:
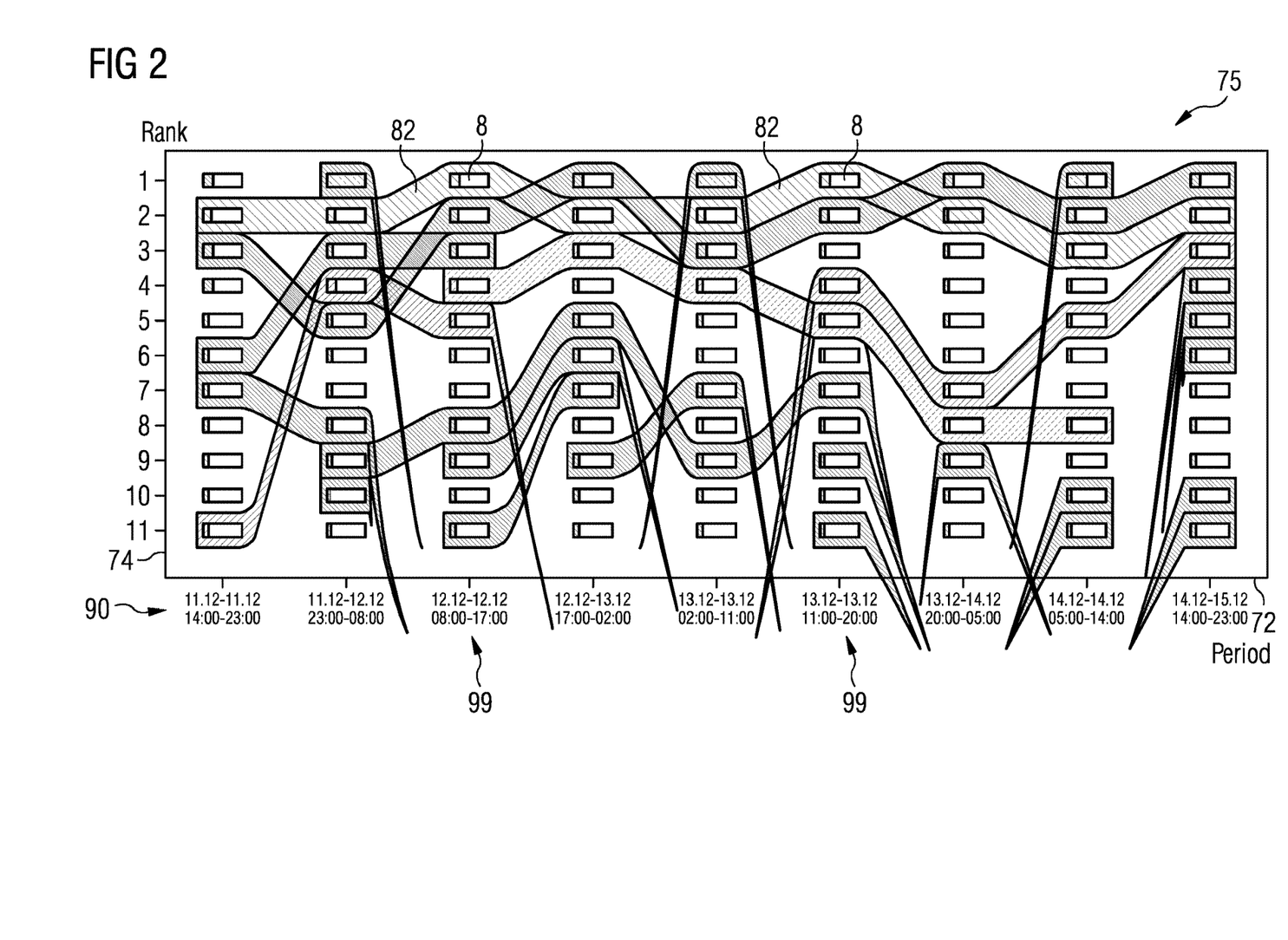
FIG. 2 schematically represents an exemplary embodiment of an interaction with the scheme of display.

FIG. 2 represents an exemplary embodiment of the method 100 that includes interaction with the display or the rank chart 75. By clicking on the connecting bands 82, one or multiple bands 82 may be highlighted by fading the remaining connecting bands 82 out. Such a highlighting may ease the perception of trends across different time slots 99.

Figure 3:
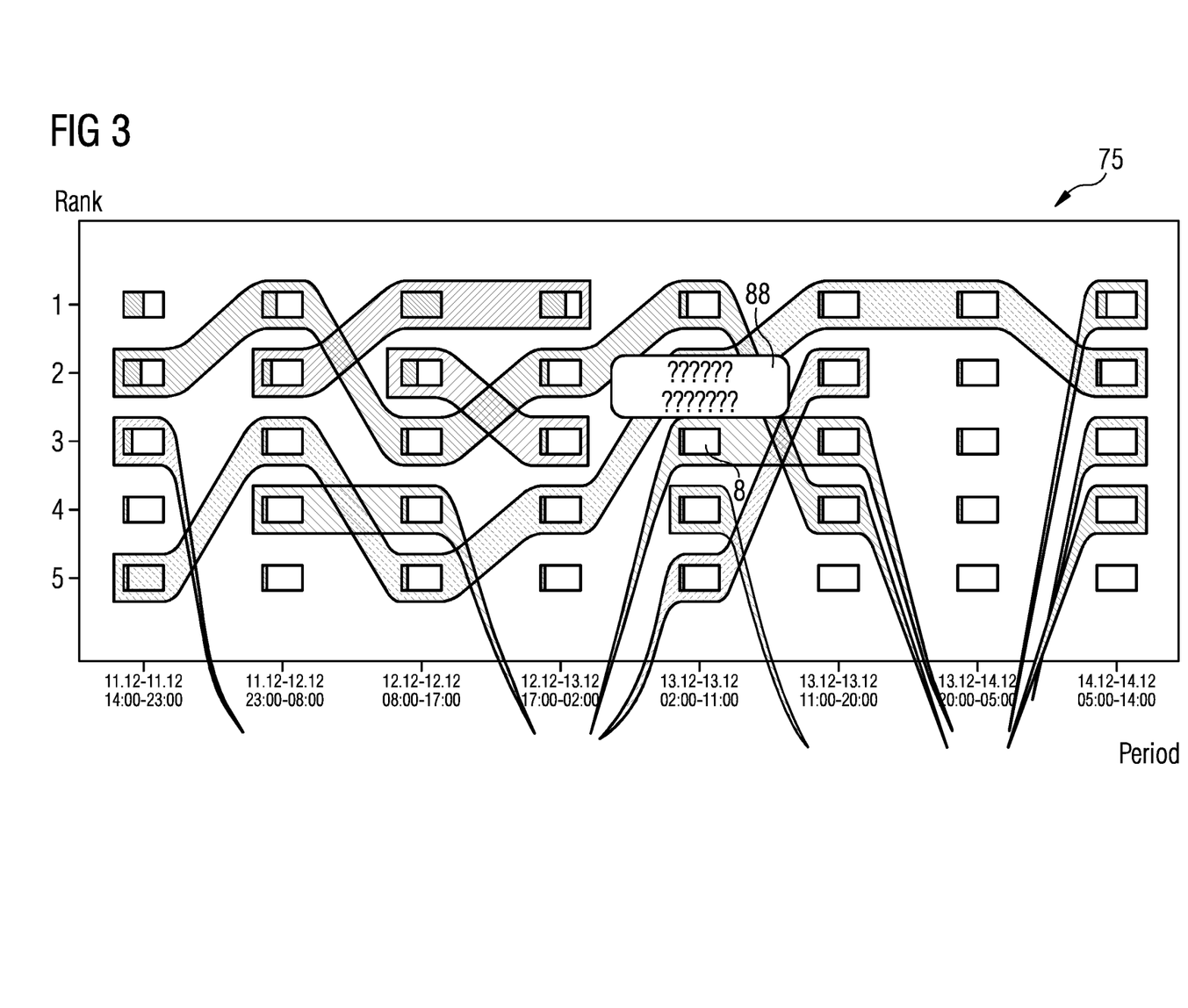
FIG. 3 schematically represents another exemplary embodiment of an interaction with the scheme of display.

FIG. 3 represents another exemplary embodiment of the method 100, where the indication of the weight of unique event inputs 5 categorized for the selected predefined event category and for the selected time slot 99 (e.g., of the different clusters) displayed on the display unit 120 is interactive. When interacted with (e.g., when a user or operator clicks or brings or positions or hovers the cursor over or on) the indication of the weight of a given cluster a numerical representation 88 of the weight of the cluster is displayed, for example, as a pop-up 88 on the display unit 120. The numerical representation 88 may also provide additional information about the event type together with the exact value of its absolute frequency or weight within the time slot 99.

In the FIGS. of the present disclosure, the number or count of the clusters of the event types shown within one time slot 99 are randomly portrayed, it is an important parameter. Though technically there is no limit regarding the number of levels shown or ranks or counts of the clusters for each time slot 99, reasonable values range approximately between three and fifteen counts.

Similarly, the technique is flexible in terms of the number of time slots 99 shown. In this case, reasonable values range between 2 and 15 time slots 99 on a normal sized display screen 120.

Figure 4:
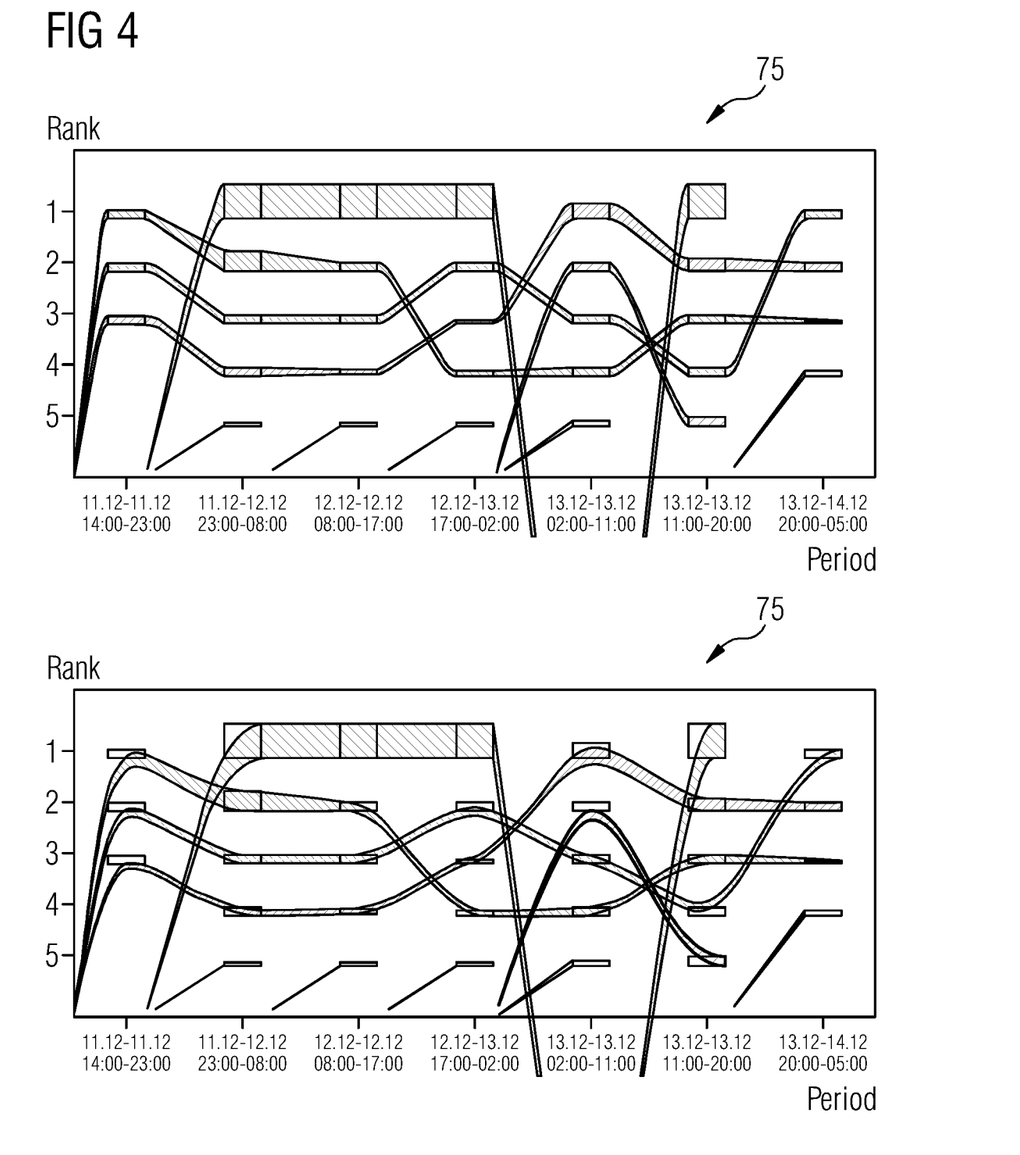
FIG. 4 schematically represents another exemplary embodiment of the scheme of display.
Figure 5:
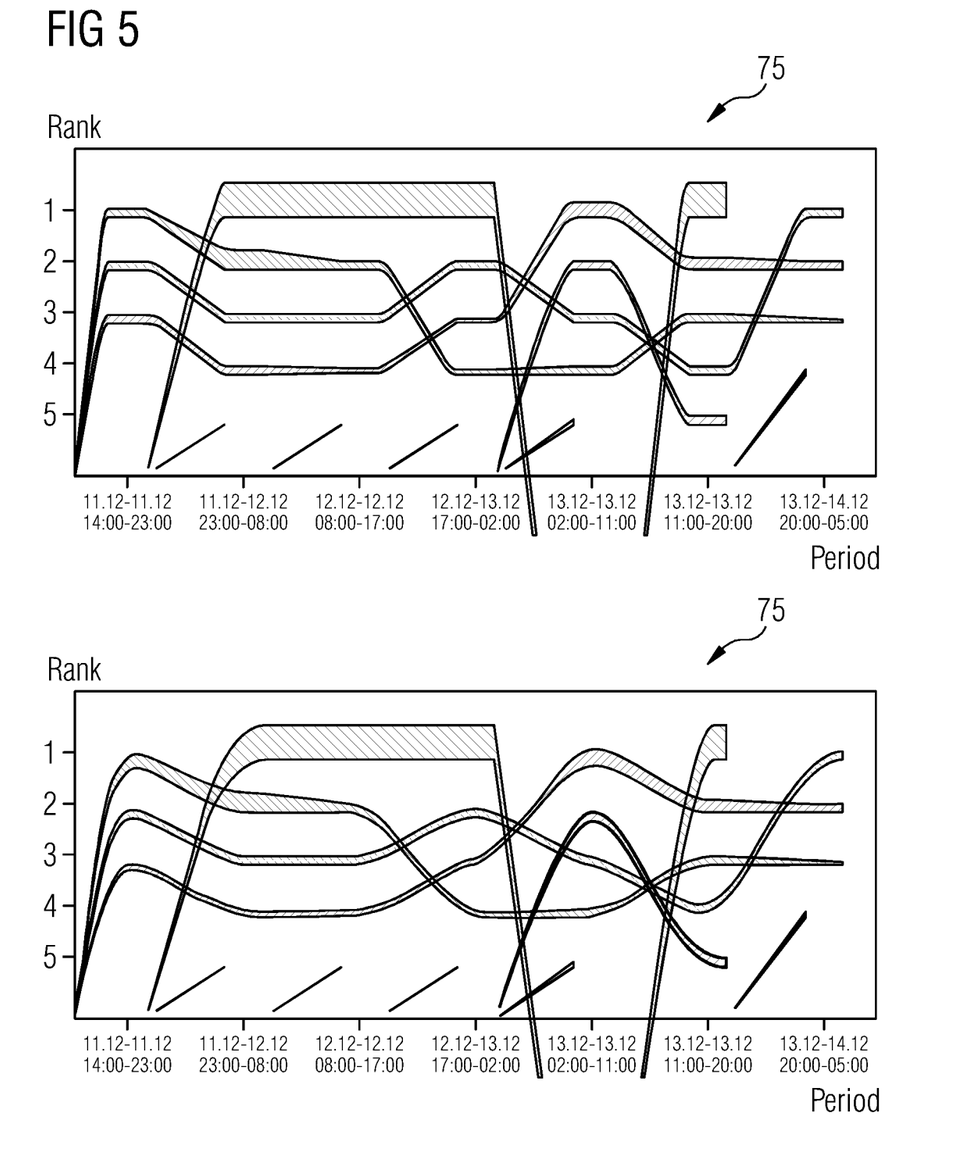
FIG. 5 schematically represents an alternate exemplary embodiment as compared to the embodiment of FIG. 4 of the scheme of display.

FIG. 4 shows a variant of the technique in which the bars representing the frequency or weight are turned by 90 degrees. The rectangle 8 enclosing the bar is not shown anymore. Due to the vertical orientation of the bars, the frequencies or weights of the event types or the clusters are now easier to compare row-wise. The connecting bands 82, also referred to as ribbons, are now sized in a way that thickness at the position of the rectangle 8 is the same as the height of the rectangle 8. To get a visually more appealing view, the course of the ribbons 82 may be smoothed (see FIG. 4 right side). FIG. 5 shows the embodiment of FIG. 4 without the rectangles 8 or the boxes 8. This view may be preferable over the default view discussed above if multiple rank charts 75 are to be compared, or what is most important in the analysis is the general trends in terms of the rise or fall of an event type in the ranking.

While the present technique has been described in detail with reference to certain embodiments, the present technique is not limited to those precise embodiments. Rather, in view of the present disclosure, which describes exemplary modes for practicing the invention, many modifications and variations would present themselves to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for monitoring technical equipment, the method comprising:
   receiving, by a processor, a plurality of event inputs from one or more event status reporting units, wherein each event input of the plurality of event inputs belongs to one of a plurality of predefined event categories;
   segregating, by the processor, a time period into an ordered sequence of time slots, wherein the time period represents a time duration within which the plurality of event inputs were received;
   categorizing, by the processor, each event input of the plurality of event inputs according to a time slot within which the event input was received and according to a predefined event category of the plurality of predefined event categories to which the event input belongs;
   assigning, by the processor, a rank to each predefined event category of the plurality of predefined event categories within each of the ordered sequence of time slots, wherein the rank of a selected predefined event category within a selected time slot is based on a weight of unique event inputs, the unique event inputs being categorized for the selected predefined event category and for the selected time slot;
   defining, by the processor, a count of symbols to be displayed for each of the time slots, wherein each symbol represents a unique predefined event category, and wherein the count of the symbols is same for all the time slots;
   displaying, on a display unit, the ordered sequence of time slots; and
   displaying, on the display unit, for each of the ordered sequence of time slots, the defined count of symbols ordered according to the ranks of the respective predefined event categories represented by the symbols, wherein each symbol includes an indication of the weight of unique event inputs categorized for the selected predefined event category and for the selected time slot.

2. The method of claim 1, wherein for at least one of the selected predefined event categories, the weight of the unique event inputs categorized for the selected predefined event category and for the selected time slot is a number of the unique event inputs categorized for the selected predefined event category and for the selected time slot.

3. The method of claim 1, wherein for at least one of the selected predefined event categories, the weight of the unique event inputs categorized for the selected predefined event category and for the selected time slot is a percentage calculated depending on an application and the event category for the unique event inputs categorized for the selected predefined event category and for the selected time slot.

4. The method of claim 1, wherein the indication of the weight of unique event inputs categorized for the selected predefined event category and for the selected time slot displayed on the display unit is interactive and is configured to show a numerical representation of the weight of unique event inputs categorized for the selected predefined event category and for the selected time slot when interacted with by an operator.

5. The method of claim 1, wherein at least one of the event status reporting units is a sensor, and at least one of the predefined event categories is readings of the sensor, and
wherein the event inputs belonging to the predefined event category are the readings having predetermined characteristics.

6. The method of claim 1, wherein at least one of the event status reporting units is an input device configured to receive inputs manually, and at least one of the predefined event categories is inputs received by the input device, and
wherein the event inputs belonging to the predefined event category are the inputs having predetermined characteristics.

7. The method of claim 1, wherein the processor is a programmable logic controller.

8. The method of claim 1, wherein displays are represented graphically having an x-axis representing the time slots and a y-axis representing the ranks, and
wherein the symbols are 2-dimensional shapes having an enclosed area, and the indication of the weight of unique event inputs within the symbols is provided by demarcating a section of the enclosed area corresponding to the weight of unique event inputs.

9. The method of claim 1, wherein the symbol representing a given unique predefined event category within a given time slot displayed on the display unit has connecting bands associated with the symbol when the symbol representing the given unique predefined event category appears within at least two of the given time slots displayed on the display unit, and
wherein the symbol representing the given unique predefined event category within the given time slot displayed on the display unit is connected by the connecting bands to the symbols representing the given unique predefined event category within time slots adjacent to the given time slot.

10. The method of claim 9, wherein the connecting band associated with the symbol representing the given unique predefined event category within the given time slot starts from the symbol and ends at a pre-designated area in the graphical representation when the symbol representing the given unique predefined event category is absent from within the adjacent subsequent time slot, and
wherein the connecting band associated with the symbol representing the given unique predefined event category within the given time slot starts from the pre-designated area and ends at the symbol when the symbol representing the given unique predefined event category is absent from within the adjacent previous time slot.

11. A user interface for monitoring technical equipment, the user interface comprising:
a data interface configured to receive a plurality of event inputs from one or more event status reporting units, wherein each event input of the plurality of event inputs belongs to one predefined event category of predefined event categories;
a processor configured to:
segregate a time period into an ordered sequence of time slots, wherein the time period represents a time duration within which the plurality of event inputs were received;
categorize each event input of the plurality of event inputs according to the time slot within which the event input was received and according to the predefined event category to which the event input belongs;
assign a rank to each of the predefined event categories within each of the ordered sequence of time slots, wherein the rank of a selected predefined event category within a selected time slot is based on a weight of unique event inputs, the unique event inputs being categorized for the selected predefined event category and for the selected time slot; and
define a count of symbols to be displayed for each of the time slots, wherein each symbol represents a unique predefined event category, and wherein the count of the symbols is same for all the time slots; and
a display unit configured to display the ordered sequence of time slots and to display for each of the ordered sequence of time slots, the defined count of symbols ordered according to the ranks of the respective predefined event categories represented by the symbols, wherein each symbol includes an indication of the weight of unique event inputs categorized for the selected predefined event category and for the selected time slot.

12. The user interface of claim 11, wherein for at least one of the selected predefined event categories, the weight of the unique event inputs categorized for the selected predefined event category and for the selected time slot is one of a number of the unique event inputs categorized for the selected predefined event category and for the selected time slot, a percentage calculated depending on an application and the event category for the unique event inputs categorized for the selected predefined event category and for the selected time slots, and a combination thereof.

13. The user interface of claim 11 or 12, wherein the processor is a programmable logic controller.

14. A non-transitory computer-readable storage media storing instructions executable by one or more processors of a computer system to monitor technical equipment, the instructions comprising:
receiving, by a processor, a plurality of event inputs from one or more event status reporting units, wherein each event input of the plurality of event inputs belongs to one of a plurality of predefined event categories;

segregating, by the processor, a time period into an ordered sequence of time slots, wherein the time period represents a time duration within which the plurality of event inputs were received;

categorizing, by the processor, each event input of the plurality of event inputs according to a time slot within which the event input was received and according to a predefined event category of the plurality of predefined event categories to which the event input belongs;

assigning, by the processor, a rank to each predefined event category of the plurality of predefined event categories within each of the ordered sequence of time slots, wherein the rank of a selected predefined event category within a selected time slot is based on a weight of unique event inputs, the unique event inputs being categorized for the selected predefined event category and for the selected time slot;

defining, by the processor, a count of symbols to be displayed for each of the time slots, wherein each symbol represents a unique predefined event category, and wherein the count of the symbols is same for all the time slots;

displaying, on a display unit, the ordered sequence of time slots; and displaying, on the display unit, for each of the ordered sequence of time slots, the defined count of symbols ordered according to the ranks of the respective predefined event categories represented by the symbols, wherein each symbol includes an indication of the weight of unique event inputs categorized for the selected predefined event category and for the selected time slot.

15. The non-transitory computer-readable storage media of claim 14, wherein for at least one of the selected predefined event categories, the weight of the unique event inputs categorized for the selected predefined event category and for the selected time slot is a number of the unique event inputs categorized for the selected predefined event category and for the selected time slot.

16. The non-transitory computer-readable storage media of claim 14, wherein for at least one of the selected predefined event categories, the weight of the unique event inputs categorized for the selected predefined event category and for the selected time slot is a percentage calculated depending on an application and the event category for the unique event inputs categorized for the selected predefined event category and for the selected time slot.

17. The non-transitory computer-readable storage media of claim 14, wherein the indication of the weight of unique event inputs categorized for the selected predefined event category and for the selected time slot displayed on the display unit is interactive and is configured to show a numerical representation of the weight of unique event inputs categorized for the selected predefined event category and for the selected time slot when interacted with by an operator.

18. The non-transitory computer-readable storage media of claim 14, wherein at least one of the event status reporting units is a sensor, and at least one of the predefined event categories is readings of the sensor, and wherein the event inputs belonging to the predefined event category are the readings having predetermined characteristics.

* * * * *